United States Patent [19]
Becker

[11] 3,990,202
[45] Nov. 9, 1976

[54] INSULATING WALL UNIT

[76] Inventor: Otto Alfred Becker, Robert-Koch-Strasse 59, 66 Saarbruecken, Germany

[22] Filed: July 30, 1974

[21] Appl. No.: 493,049

Related U.S. Application Data

[60] Division of Ser. No. 231,815, March 6, 1972, Pat. No. 3,834,096, which is a continuation-in-part of Ser. No. 826,958, May 22, 1969, Pat. No. 3,646,721, and a continuation-in-part of Ser. No. 37,068, May 13, 1970, abandoned.

[30] Foreign Application Priority Data

| | | |
|---|---|---|
| May 13, 1969 | Germany | 1924313 |
| May 21, 1969 | Germany | 1925789 |
| June 25, 1969 | Germany | 1932202 |
| July 22, 1969 | Germany | 1937086 |
| Aug. 14, 1969 | Germany | 1941401 |
| Aug. 23, 1969 | Germany | 1943042 |
| Nov. 21, 1969 | Germany | 1958499 |
| May 22, 1968 | Germany | 1759635 |
| Sept. 21, 1968 | Germany | 1784816 |
| Mar. 29, 1969 | Germany | 1916384 |

[52] U.S. Cl. ............... 52/172; 52/173 R; 52/404; 52/618
[51] Int. Cl.² ............... E06B 7/12; E04B 1/74; E04B 2/28
[58] Field of Search ............ 52/172, 173, 171, 304, 52/404–407, 425, 302, 303, 309, 615, 618

[56] References Cited

UNITED STATES PATENTS

| | | | |
|---|---|---|---|
| 2,062,747 | 12/1936 | Gelstharp | 52/172 |
| 2,238,022 | 4/1941 | Johnson | 52/404 |
| 2,406,815 | 9/1946 | Elfving | 52/618 X |
| 2,441,571 | 5/1948 | Heineman | 52/304 X |
| 2,662,043 | 12/1953 | Clements | 52/404 X |
| 3,167,159 | 1/1965 | Bovenkerk | 52/303 X |
| 3,412,513 | 11/1968 | Gosele | 52/615 X |
| 3,432,859 | 3/1969 | Jordan et al. | 52/618 X |
| 3,501,367 | 3/1970 | Parker | 52/615 X |
| 3,604,163 | 9/1971 | McCurdy et al. | 52/172 |
| 3,646,721 | 3/1972 | Becker | 52/618 |

Primary Examiner—J. Karl Bell
Attorney, Agent, or Firm—Erich M. H. Radde

[57] ABSTRACT

A wall unit comprising panels lying at opposite faces of said unit, a seal arranged between the margins of said panels, and an insulation occupying the cavity between said panels, wherein the improvement comprises at least one insulating group extending parallel to said panels and comprising two foils capable of reflecting thermal radiation and chambers lying between said foils, the walls of which consist of insulating material. The cavity between said panels may be evacuated or it may be filled with dry air or a dry gas.

4 Claims, 13 Drawing Figures

INSULATING WALL UNIT

CROSS-REFERENCES TO RELATED APPLICATIONS

The present application is a division of application Ser. No. 231,815, filed Mar. 6, 1972, now U.S. Pat. No. 3,834,096, which is in turn a continuation-in-part of application Ser. No. 826,958, filed May 22, 1969, now U.S. Pat. No. 3,646,721, and a continuation-in-part of application Ser. No. 37,068, filed May 13, 1970, now abandoned.

BACKGROUND OF THE INVENTION

1. Field Of The Invention
2. Description of the Prior Art

A known wall unit with thermal and acoustic insulation comprises two sheet metal panels of equal size, sealing strips of resilient material arranged between the margins of said panels, and insulating plates filling the cavity between said panels. When used as components of an external wall, the individual wall units are suspended on wall supports by means of angle brackets. Similar wall units serve as partition walls extending from floor to ceiling for internal rooms. The thermal and acoustic insulation of such wall units is however, poor.

SUMMARY OF THE INVENTION

It is one object of the present invention to provide a wall unit with improved thermal and acoustic insulation, whereby corrosion thereof is prevented.

Other objects of the present invention and advantageous features thereof will become apparent as the description proceeds.

In a wall unit according to the present invention comprising opposite sheet metal panels, seals arranged between the margins of said panels and insulation accommodated in the cavity between said panels, there is provided at least one insulating group extending parallel to said panels which is composed of two high gloss foils capable of reflecting thermal radiation, and of chambers arranged between said foils, the walls of said chambers consisting of insulating material. Thus a highly effective insulation is attained. Heat absorbed e.g. by the outer panel is imparted to the foil on the inside thereof. From this high-gloss foil few thermal rays only are radiated, which penetrate through said chambers, impinge the opposite foil, and are almost completely reflected by the latter, so that this second foil is heated to a very low extent only. The walls of said chambers are made of insulating material, e.g. in the form of honeycombs, the webs of which are thin, so that heat conduction through these webs is low. The chambers are small and tightly sealed, so that likewise hardly any heat transfer takes place by convection through the air.

By arranging several such insulating groups consisting of foils and chambers one behind the other the effect is considerably increased, whereby even the strictest requirements can be fulfilled. Between any such groups an insulating plate may be inserted, which reduces the thermal conduction from one foil to the other.

Between the foils also insulating plates e.g. of hardened synthetic foam may be arranged which have on both faces ribs for the formation of chambers. In order to reduce the contact areas, through which heat transfer takes place, an insulating plate having horizontal ribs is followed by an insulating plate having vertical ribs.

Instead of complete plates, strips only may be placed alternately in horizontal and vertical positions against a reflecting foil interposed between them. The recesses between the ribs may be coated with reflecting adhesive tapes or the ribbed plates may be completely coated with a reflecting layer or adhesive foil.

The insulating chamber may be formed by narrow insulating plates e.g. of 5 mm. width e.g. of solidified synthetic foam perforated from face to face and tightly sealed on both faces by highly reflective foils, the remaining structure of hardened synthetic foam constituting the geometrical shape of the chamber walls.

Moreover the cavity between the panels may be evacuated. Any heat transfer by convection is then excluded. This entails the further advantage that formation of condensate and consequent corrosion are prevented.

Further improvement of the insulation is attained by evacuating the air from the cavity between the sheet metal panels. For this purpose the individual wall elements may be provided with valves, or all the wall elements may be connected to a vacuum pump by a pipe line. Evacuation prevents any heat transfer by convection. Moreover, the formation of condensate is prevented which condensate might reduce the reflectivity of the high-gloss reflector foils.

The thermal insulation properties of the wall units described hereinabove apply substantially likewise to acoustic insulation.

When the air is not evacuated, it is preferably displaced by dry air. For this purpose the air-tight wall units are connected by pipe lines to an air drying plant. Corresponding to the atmospheric fluctuations of air pressure, dry air is additionally received by the wall units from such an air drying plant when the atmospheric pressure rises, and is discharged by the wall unit into said plant when the atmospheric pressure drops. The pressure in the wall unit thus is at any time in substantial equilibrium with the atmospheric pressure, without humidity being able to enter into the wall unit.

It is, of course, also possible to provide the cavity itself with air drying material so that the air in the cavity is kept dry. After evacuating the cavity and placing the air drying material therein, the wall unit may be air-tightly sealed. Thus on changes in temperature and pressure the evacuated cavity or the cavity filled with air or a gas is always kept dry so that no moisture can precipitate on the reflecting foils of the insulating wall unit of this invention.

Thus the present invention consists in principle in providing means in the cavity of the insulating wall unit which prevents that the degree of saturation with moisture of the air or gas in the wall element is exceeded and that water of condensation is deposited on the walls of the cavity of the insulating wall unit and on the reflecting foils. Such deposition of water of condensation, especially on the reflecting foils, which otherwise will take place due to the changes in temperature and air pressure of the surrounding atmosphere, will result in a very considerable reduction in the reflection of the heat radiation by said reflecting foils. The means provided according to the present invention for preventing deposition of water of condensation within the cavity of the wall unit and on the reflecting foils or the like are adapted to permanently maintain the moisture content of the air or gas in the cavity below a predetermined maximum value, i.e. sufficiently above the dew point of the relative degree of moisture, so that the reflecting surfaces do not become covered with moisture. Such means are, for instance, a. complete or partial evacuation of the cavity of the wall unit which can then be air-tightly sealed or which can be connected with a pump;

b. providing a substantially dry air or gas atmosphere within the wall unit, for instance, by placing therein an air- or gas-drying material and air-tightly sealing the cavity;

c. circulating a substantially dry gas or dry air through the wall unit whereby the gas or air is passed through a drying system to remove any moisture present, or accumulating, in said circulating gas or air; or d. venting the dry air introduced into the wall unit to the atmosphere thereby passing it through a dryer so that the dry air, if its volume increases due to an increase in temperature passes out to the atmosphere and if the volume of the air decreases due to a drop in temperature, air is drawn in from the atmosphere through the air drying device.

All these and other means prevent formation of condensate and reduction of the reflectivity of the reflecting foils due to the deposition of water of condensation thereon. In addition thereto corrosion of the reflecting foils is prevented or at least very considerably retarded. When evacuating the cavity, any heat transfer by convection is excluded.

BRIEF DESCRIPTION OF THE DRAWINGS

Several embodiments of the invention are illustrated by way of example in the accompanying drawings withtout, however, limiting the invention thereto. In said drawings.

DESCRIPTION OF THE PREFERRED EMBODIMENTS

Figure 1:
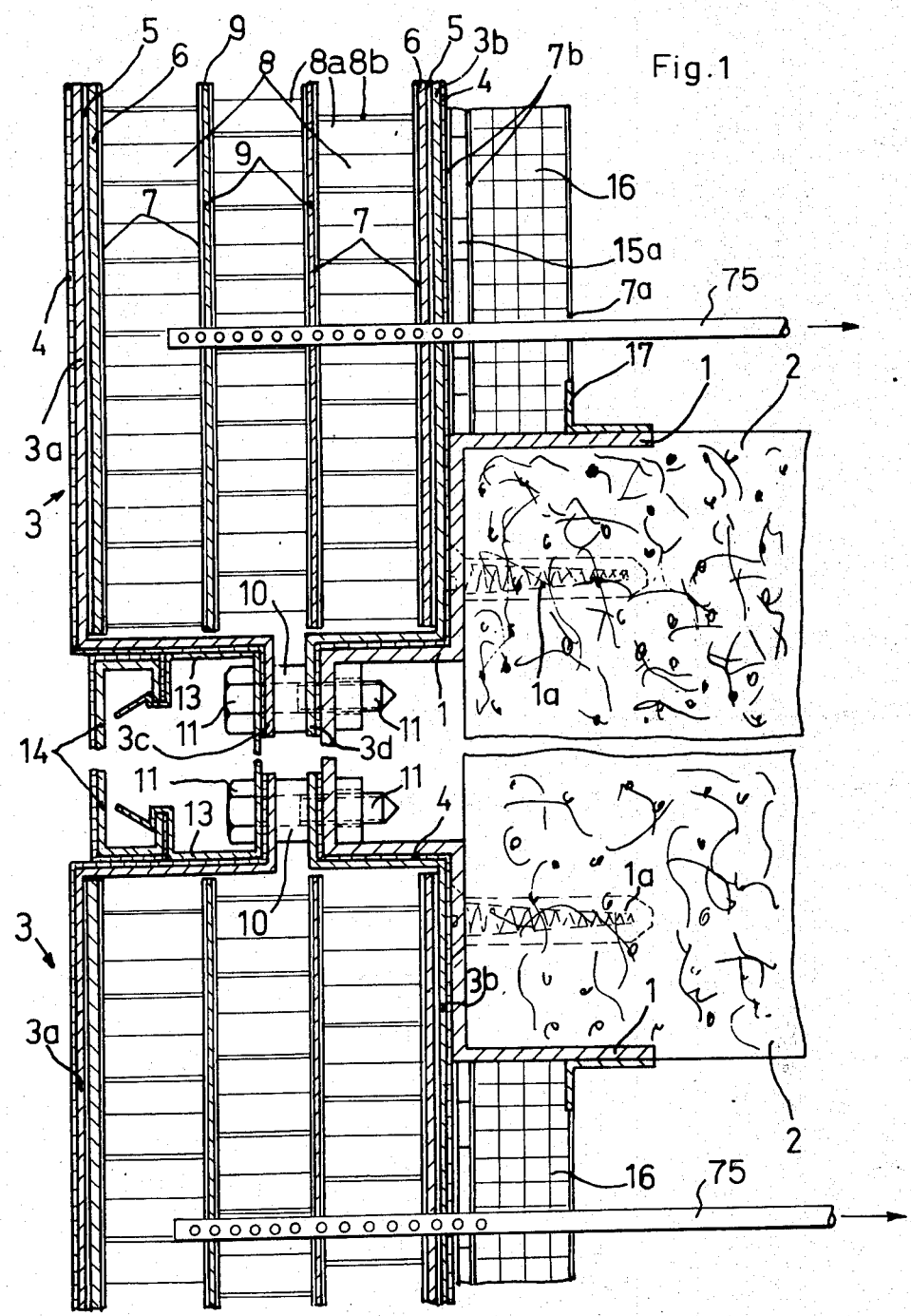
FIG. 1 is a vertical section of parts of two mutually abutting wall units constituting an external wall fixed to the ceiling of a building.
Figure 2:
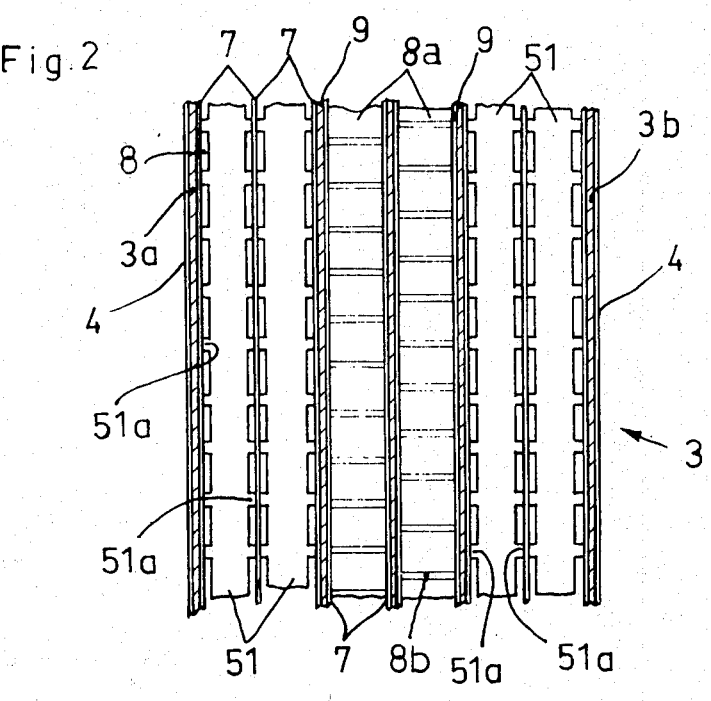
FIG. 2 is a vertical section of a wall unit with insulation by plates and by honeycombs.

In FIG. 1 sections 1 of Z-shaped profile are attached by means of screws 1a to an end face of the ceiling 2 of a building. The upper section 1 carries on an outwardly directed flange an upper wall unit 3 and the lower section 1 carries the upper edge of a lower wall unit 3. Each wall unit comprises an outer sheet metal panel 3a and an inner sheet metal panel 3b. Between the margins 3c, 3d of said panels an insulating and sealing strip 10, preferably of ebonite, is inserted. Screws 11 penetrate the margins, the sealing strips 10 and the sections 1. They press the sheet metal panels in an airtight manner against each other, and at the same time support the wall units on the building. In the cavity between the sheet metal panels an insulation is accommodated which comprises at least one highly effective insulating group extending parallel to said panels. This insulating group comprises a thin high-gloss foil e.g. of aluminum capable of reflecting thermal radiation, small cells 8 of about 8 mm. width, the walls of which consists of insulating material, and a second reflecting foil, these foils sealing off said chambers.

In a first embodiment these chambers are formed by honeycomb plates 8a, the webs 8b of which extend between the two opposite foils. Between the foils of the three insulating groups illustrated there are moreover inserted insulating plates 9 e.g. of feltboard or solidified synthetic foam, for reduction of thermal conduction and for stiffening.

For improved appearance and for protection from corrosion each of the steel metal panels is provided outside with a coating 4 of lacquer or synthetic material, and inside with a foil 5 of a sound-deadening material and a stiffening sheet metal panel 6.

Upon solar radiation of the outer sheet metal panel also the adjoining first foil is warmed. However, the high-gloss foil radiates but little heat inwards, namely about one fifth of the radiation emitted by a black body. The heat radiation emanating from the foil penetrates the chambers, impinges the opposite foil and is almost completely (say 93 percent) reflected by the high-gloss surface of the latter and is absorbed only to a small proportion (7 percent), so that the opposite foil is warmed up but little and can discharge little heat (1.25 percent) only. Heat transfer by radiation is accordingly very small. Moreover heat conduction takes place through the edges of the webs of the honeycomb contacting the foils. However, since the cross-sectional area of the webs contacting the foils amounts to about 4 percent only of the whole area of a foil, and the webs consist of insulating material, also the heat conduction is very low. Finally heat could be transferred by convection through the enclosed air. However, since a great many and consequently small cells are formed by the honeycomb plates, an air flow and consequent heat transfer can hardly take place. When several insulating groups are arranged in series, their effect is greatly increased. In a test with five insulating groups, the outer sheet metal panel was raised to a temperature of 100° C. and kept at that temperature, while the inner sheet metal panel was exposed to a room temperature of 20° C. After four hours a steady condition was attained in which the temperature of the inner sheet metal panel had increased from 20° C. to 30° C. At an external temperature of 70° C. the temperature of the inner sheet metal panel rose by 7° C. and at an external temperature of 45° C. by 3° C. only.

The walls of the honeycomb cells may be provided with highly reflective very thin metal surface layers (e.g. by deposition of aluminum from the vapor phase in vacuo). For reasons of fire protection the honeycombs may be made fire-proof by impregnation or the like. Likewise mats of glass fibers may be arranged as an insulation on the internal surfaces of the wall panels as well as e.g. between two aluminum foils whereby the wall units, in conjunction with the reflecting metal foils and sheet metal panels (thermal reflection) and the impregnated and hardened honeycombs, are made extraordinarily fireproof.

The gaps between any two adjacent wall units may be outwardly closed by angle sections 13 held by screws 11 and by screens 14, which engage behind resilient tongues in said angle sections. For further thermal and acoustic insulation from the interior space the inner sheet metal panels may each carry a reflecting foil 7 and spacer strips 15. On the latter a plate 16 of plaster of Paris and covered on both surfaces with reflecting foils 7 is placed, which is attached to the buildings by angle sections 17 and forms the inner wall surface thereof.

Figure 12:
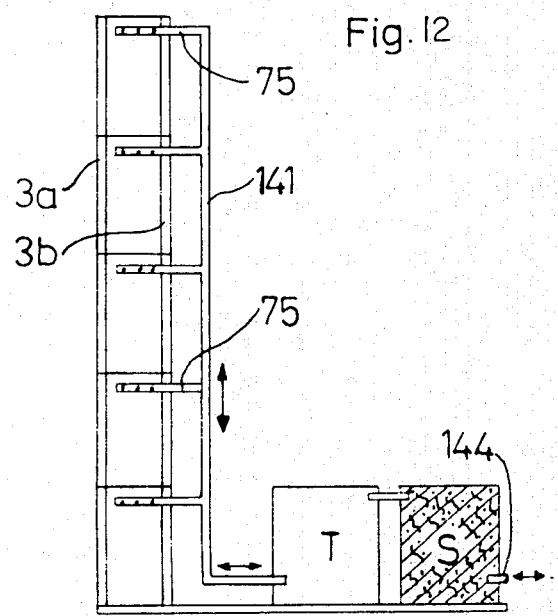
FIG. 12 is a diagrammatic sectional view through a plurality of wall units of a building, arranged one above the other showing an air dryer and a dust filter and venting to the atmosphere.

The cavity between the sheet metal panels 6 with foils 7 may be evacuated through perforated pipe 75 which is connected to a vacuum pump (not shown), and then sealed. Or the air in said cavity may be replaced by dry air or a dry gas such as nitrogen through said pipe 75 and then also sealed. Or perforated containers with a drying agent such as calcium chloride, silica gel, or the like (not shown) may be placed into the cavity which is then sealed, so as to dry the air therein. Or dry air or a dry gas may be circulated through the cavities of superposed wall units in the manner shown in FIG. 13. Or the cavity filled with dry air may be vented to the atmosphere as shown in FIG. 12. Any means to provide dry air or a dry gas atmosphere in the cavity of the wall units according to the present invention may be employed provided they maintain a dry air or gas atmosphere under subatmospheric, atmospheric, or superatmospheric pressure in the cavity and thus prevent deposition of moisture on the walls of the wall unit and especially on the reflecting foils thereon.

Figure 3:
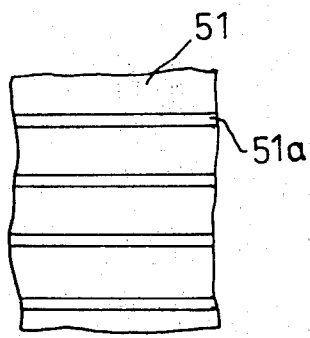
FIG. 3 shows part of an insulating plate having horizontal ribs.
Figure 4:
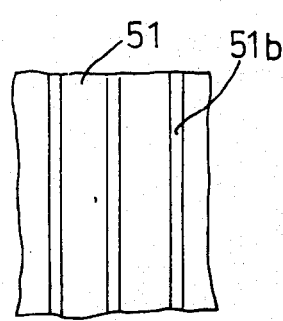
FIG. 4 of a plate having vertical ribs.
Figure 5:
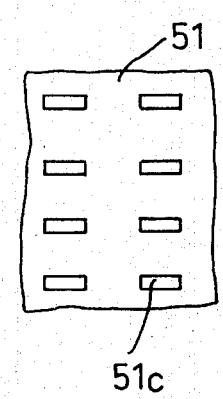
FIG. 5 of a plate having interrupted ribs.

A second embodiment of the present invention is illustrated in FIGS. 2 to 5. The wall unit 3 comprise an outer sheet metal panel 3a and an inner sheet metal panel 3b. Each of them has a coating 4. The inserted insulation comprises six insulating groups. The two middle groups are made of honeycomb plates 8a as in the first embodiment. The outer groups are formed by insulating plates 51, e.g. of hardened synthetic foam, which have narrow ribs 51a about 5 mm. wide on both faces and form strip-shaped cells 8. In FIG. 3 an insulating plate is illustrated in elevation having horizontal ribs 51a, in FIG. 4 a plate with vertical ribs 51b and in FIG. 5 one with rows of projections 51c.

The first insulating plate is followed by a second reflecting foil 7 and by a second insulating plate, the ribs of which run at right angles to those of the first insulating plate; Thus thermal conduction can occur at the crossing points only of the ribs. A third reflecting foil 7 seals these cells off. Between the insulating groups sheet metal panels 9 may be arranged which prevent any buckling of the thin reflecting foil under major pressures e.g. upon evacuation, which may be caused by the webs of the honeycomb plates or ribs of the insulating plates being juxtapositioned to each other on points only.

When the sheet metal panels 9 themselves are highly reflective, the foils may be dispensed with.

These wall units may also be provided with dry air or a dry gas atmosphere or may be evacuated as described hereinabove.

Figure 6:
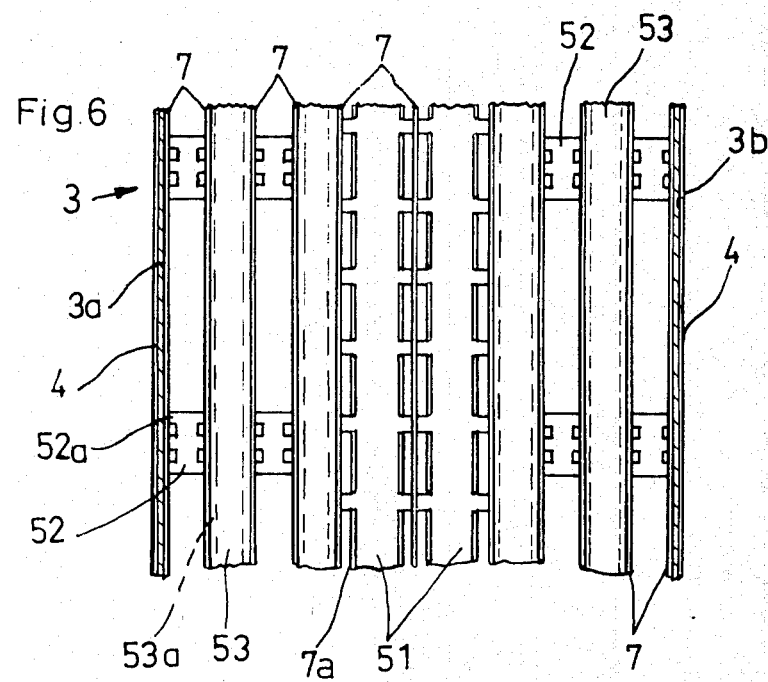
FIG. 6 is a section of a wall unit with insulation by strips and plates.

In a third embodiment of the present invention, instead of insulating plates, insulating strips only are used, the contact surfaces of which have ribs. In FIG. 6 the sheet metal panels 3a, 3b are provided externally with coatings 4. The first insulating group is formed by horizontal insulating strips 52 with ribs 52a, which may be attached by glueing to the contacting reflector foils 7. The second group has vertical insulating strips 53 with ribs 53a. Then follows a third group with horizontal strips and a fourth group with vertical strips. In the cells between these insulating strips heat transfer by convection hardly occurs. In the middle of the unit two groups are arranged each with insulating plates 51 having horizontal ribs and corresponding reflector foils. Moreover reflector foil strips 7a inserted into the recesses, whereby thermal radiation into the insulating plate in strongly reduced.

Figure 7:
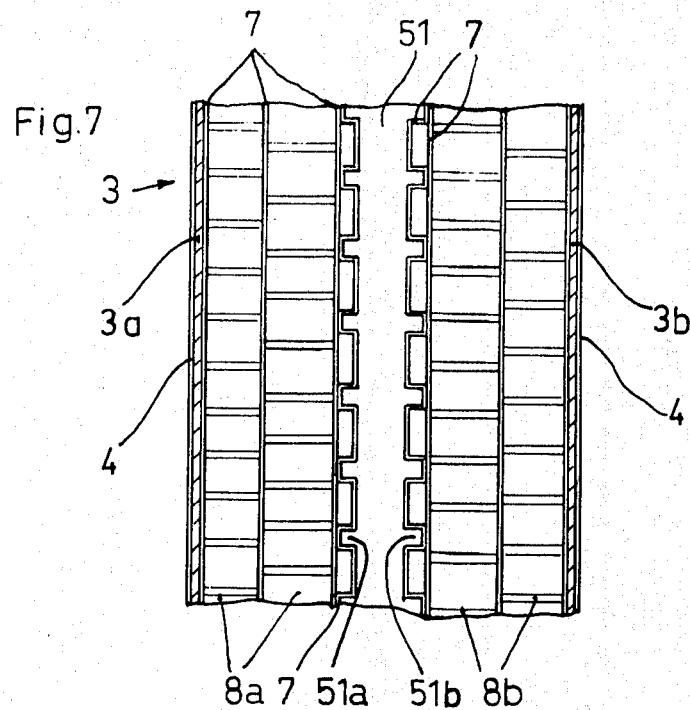
FIG. 7 is a section of a wall unit with insulation by honeycombs and by plates covered with foils.

In a fourth embodiment of the present invention according to FIG. 7 two insulating groups comprising honeycomb plates 8a and associated reflector foils 7 contact each of the sheet metal panels 3a, 3b from inside, which panels have coating 4 outside. In the middle an insulating group is arranged comprising an insulator plate 51 having ribs 51a on both faces. These ribs may be produced by pressing or rolling. At the same time reflector foils may be attached by glueing, so that the surfaces of the insulating plate are completely covered by reflector foils.

Instead of being made of sheet metal, the external panels of the wall unit may be made of the other materials, e.g. of synthetic substances. As in the preceding wall units, these wall units may also be provided with dry air or a dry gas atmosphere or may be evacuated as described hereinabove.

Figure 8:
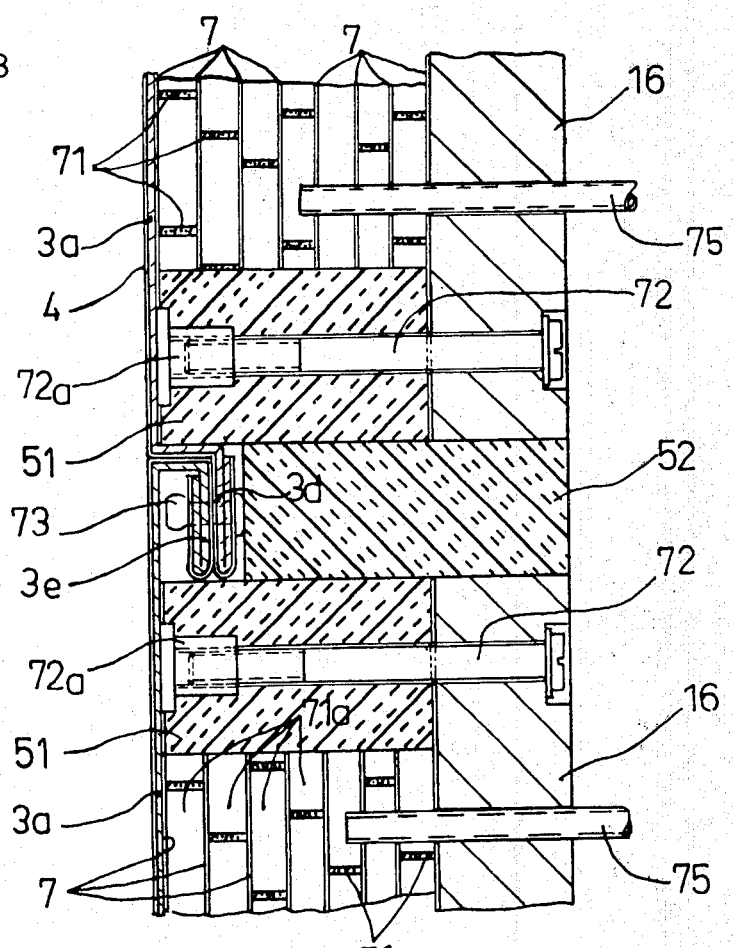
FIG. 8 is a vertical section of parts of two mutually abutting wall units with an external sheet metal panel and an inner gypsum panel and with insulating reflecting foils and spacing members formed by perforated hard plastic foam plates.
Figure 9:
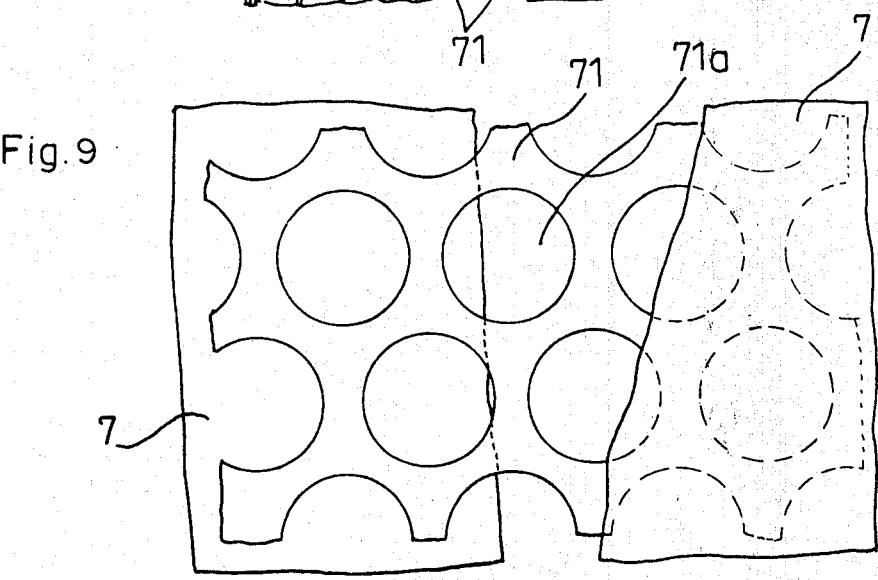
FIG. 9 is a partial elevation of a perforated hard plastic foam plate covered on both sides by reflecting foils.

In FIG. 8, an example of a suitable wall unit is illustrated in longitudinal section. Seven insulating groups with insulating foam plates 71 lie against the outer sheet metal panel 3a, which has an outer layer 4. As shown in FIG. 9, the insulating foam plates have cylindrical perforations 71a. The perforations are tightly closed on both sides by reflecting foils 7, which form narrow insulating chambers or cells containing stationary dry air or gas. In order to reduce the contact and accordingly reduce the heat conduction, it is advantageous for the surfaces of the insulating plates to be roughened. Towards the inner side of the cavity, the wall unit closed by a plaster plate 16 which is clad, towards the last insulating group, with a reflecting foil 7. The marginal sealing of the wall unit is effected by insulating strips 51, for instance of solid foam. The outer wall panel 3a and the plaster plate 16 are connected through the insulating strips, by means of plastics screws 72. For this purpose, on the inner side of the wall panel 3a, a nut 72a is welded by the stud welding method. For connecting an upper and a lower wall unit, the sheet metal panel margins are provided with angled portions, the lower panel having the U-shaped angle formation 3e and the upper panel having the L-shaped angle formation 3d. The mutually engaging angle formations are connected by rivets 73. After fixing, an insulating margin filling strip 52 is pushed into the open gap between the upper and lower wall units. In this example, the sheet metal panels are mutually supported and can withstand pressure.

The insulation can be increased by evacuation of the cavity between the sheet metal panels. For this purpose, the individual wall units may be provided with valves and/or all wall units may be connected through a pipe with a common evacuating installation (not shown). The evacuation excludes heat transmission by convection. Moreover, formation of condensed water is prevented, which would reduce the reflecting capability of the highly polished reflecting foils.

Figure 13:
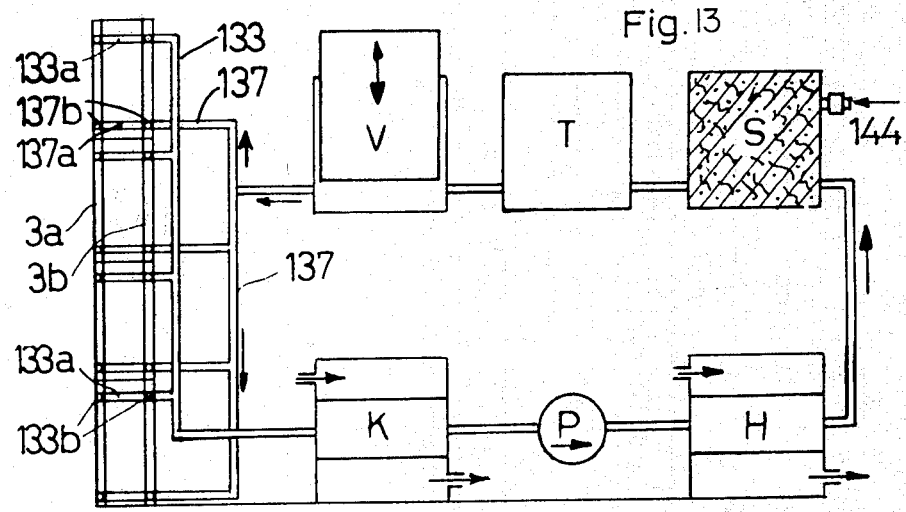
FIG. 13 is a diagrammatic section view through a plurality of wall units arranged one above the other, connected to a circulation pump, an air conditioning installation, and a volume compensating device.

For avoiding pressure differences, hoses or pipes 75 may extend through the plaster plate 16 into the interior of the wall unit, which connect the cavity of the airtight wall unit with the atmosphere, through an air drying installation, or connect it with a volume compensating device as shown in FIGS. 12 and 13.

Pipe 75 may also be used for evacuating the cavity between the sheet metal panels. For this purpose said pipe 75 is connected with a vacuum pump (not shown) and a valve (also not shown) is interposed between vacuum pump and wall unit. After evacuating the cavity of the wall unit, the valve is closed and the pipe leading to the pump as well as the pump are removed. They can be attached again for subsequent evacuation if the need arises.

Figure 10:
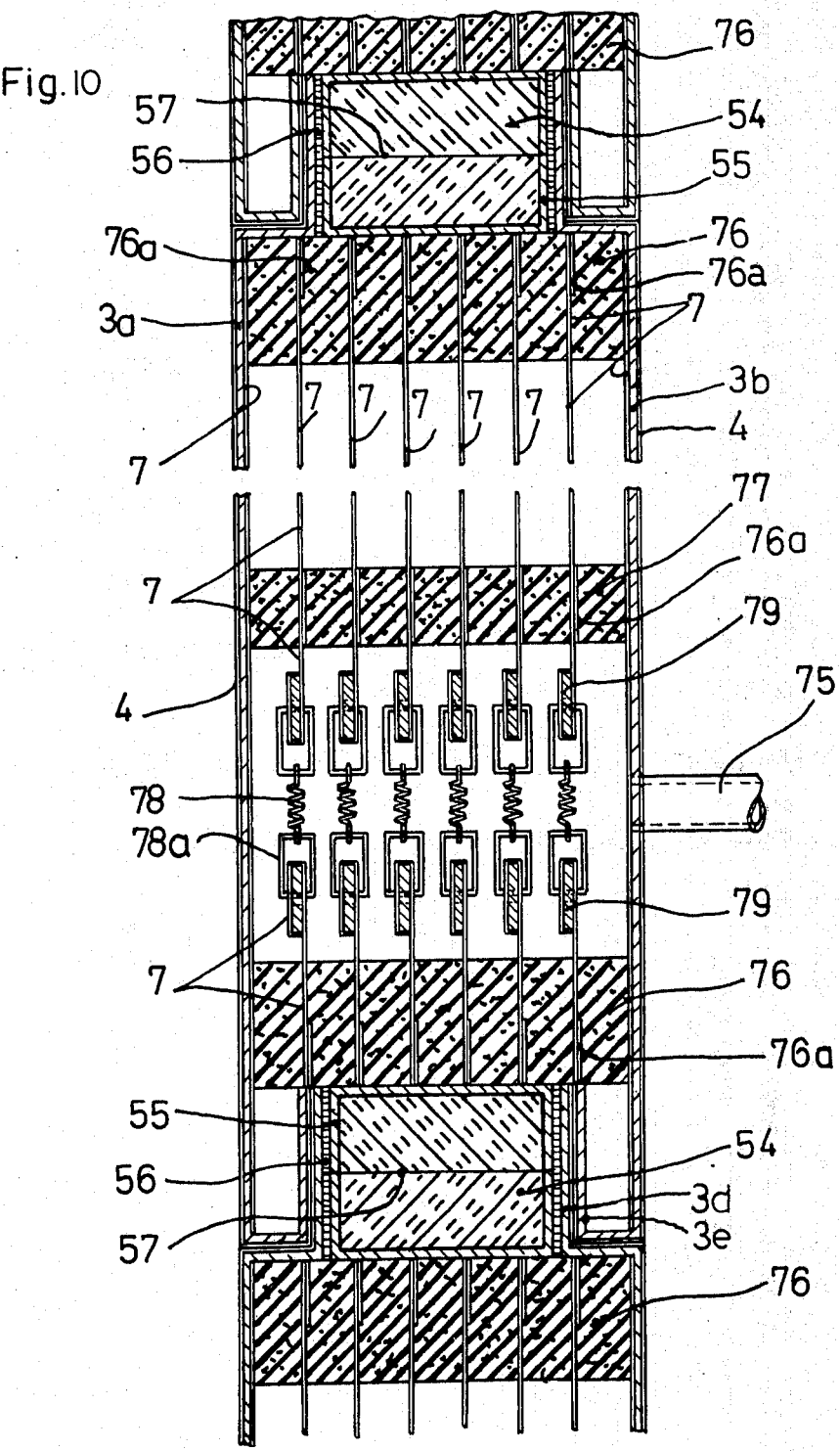
FIG. 10 is a vertical sectional view of a wall unit having insulating reflecting foils tensioned by means of springs.

The example of FIG. 10 enables a still smaller use of insulating material. The outer panel 3a and the inner panel 3b are covered on the outside with a coating 4 and are internally clad with a reflecting foil 7. In the cavity further reflecting foils, for instance, highly polished aluminum foils are mounted under tension, for instance, at spacings of only a few millimeters, preferably five to ten millimeters. For this purpose, the upper margins of the foils are fixed onto fixing strips 76, preferably of hard foam, for instance, by an adhesive coating 76a, and the fixing strips together with the foils are inserted into the panels and substantially air-tightly connected between themselves and with the panels. The lower margins of the foils are rolled around metal strips 76 and are simultaneously bonded. The metal strips have poles for the provision of links 78a which can be suspended on springs 78. In a mirror symmetrical arrangement, the other ends of the springs are secured through metal strips onto foils, the other ends of which are held by fixing strips between the panels. The foils may be provided with spacing strips 77 above the metal strips, which are held on only one side by an adhesive coating 76a, the other side simply lying in free contact and allowing the passage of air. The panels are provided at the upper margin with L-shaped angled portions 3a and at the lower margin with U-shaped angled portions 3e, so that abutting wall units can be pushed one into the other in a tongue and groove-like manner. The cavity between the angled portions 3e is closed off by marginal strips 54 of hard plastics foam. For reinforcing, the marginal strips may be surrounded by a rectangular tube 55 of plastics material and the tube can be air-tightly incorporated, with the aid of rubber strips 56. For complete air closure, the rectangular tube 55 and the strips 54 may be horizontally subdivided and stuck together again with the interposition of a metal foil 57 as a vapor barrier. Into the intermediate space between the lower fixing strips 76 and the spacing strips 77, a pipe 75, for instance, of plastics material extends, the pipe being connected through a pipe network to the atmosphere through an air drying installation, or being connected to a compensating device or with a vacuum pump to evacuate the cavity.

Instead of the cavities in the wall units, and the circulatory system being filled with air, other dry gases, for instance, nitrogen may be used. This has the advantage that the surfaces of the aluminum foils are not oxidized.

Figure 11:
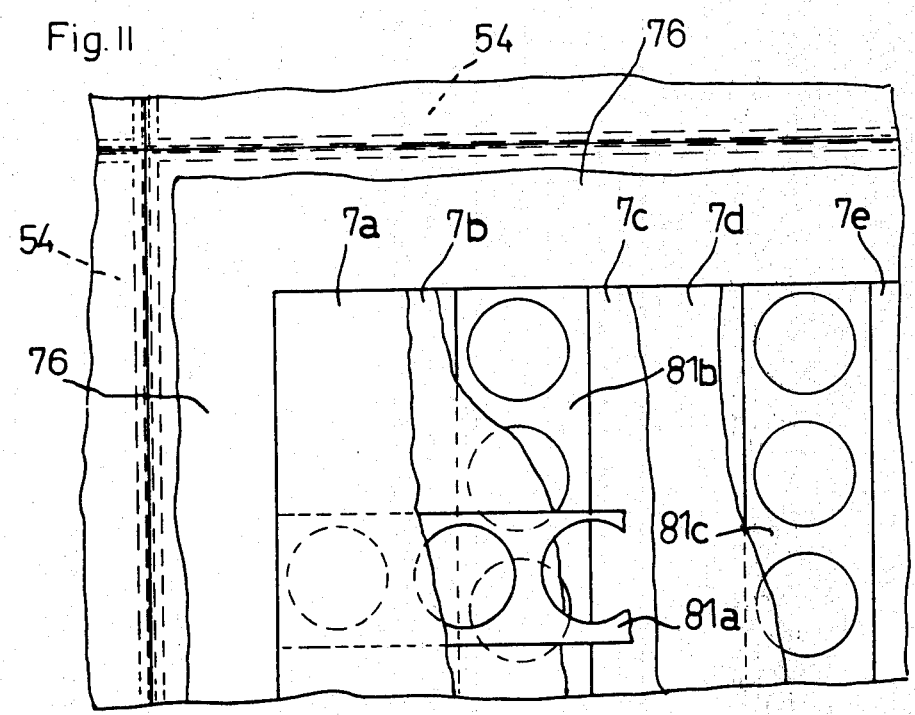
FIG. 11 is a partial elevation of a wall unit having reflecting foils and spacing members consisting of perforated hard plastic foam strips, the panels and a number of other parts being broken away.

In accordance with the front elevation shown in FIG. 11, reflecting foils 7 may be held on all margins by fixing strips 76. The cavity between the foils is subdivided into chambers or cells by perforated insulating strips 81. By showing in FIG. 11 individual foils cut away, the chambers or cells between the foils 7a and 7b, formed by horizontal insulating strips 81a, and the cavity between the foils 7b and 7c, formed by the vertical insulating strips 81b and so on, can be seen.

In place of using insulating strips 81a and 81b between the foils 7a, 7b, and 7c of FIG. 11, there may be glued small disks, blocks, or the like of insulating material upon the reflecting foils, thus creating the small chambers or cells of the wall units. Of course, as stated hereinabove, perforated plates, for instance, of hardened plastics foam can be arranged between the reflecting foils or other suitable insulating means can be provided therebetween. The reflecting chambers or cells can also be formed by providing recesses, crevices, or the like openings in said plates. It is also possible to use insulating strings, cords or the like in place of the insulating strips shown in FIG. 11 in order to form the reflecting chambers or cells.

FIG. 12 shows in which manner a plurality of wall units arranged one above the other can be filled with air. The plurality of wall units are illustrated by their outer panels 3a and their inner panels 3b. In front of each wall unit, a horizontal pipe 75 is shown which is in the vicinity of the upper end of each wall unit and which leads to a collecting line 141 which in turn leads to an air drying device T and a dust filter S which has an opening 144 to the atmosphere. If the temperature of the dry air in the wall units drops, and the air consequently decreases in volume, then air is drawn in from the atmosphere through the dust filter and the air drying device. If the volume of the dry air increases, then dry air passes out through the opening 144 to the atmosphere.

Even more reliable results are obtained by preventing deposition of moisture which occurs in cooling down the wall unit, by causing dry air or gas to circulate throughout the wall units. In FIG. 13, the individual wall units are illustrated by their outer panels 3a and their inner panels 3b. The cavities of the wall units are connected at their lower regions by transverse pipes 137a with openings 137b, to a common supply line 137, and at the upper regions by transverse pipes 133a with openings 133b, to a common take-off line 133. The take-off line leads to a circulating pump P, a dust filter S, a dryer T, a volume compensating device V and back to the common supply line 137, so that the path of circulation is closed.

Preferably, this circulation can also be used for performing a temperature conditioning of the wall units, that is to say heating or cooling them according to requirements. For this purpose, a cooling device K and a heating device H with thermostat control are additionally provided in the circulation path of the dry air. Furthermore, the dust filter has an opening 144 leading to the atmosphere, in order to be able to make up for losses of dry air. Said opening 144 may also lead to a gasometer (not shown) partly filled with a suitable gas such as nitrogen, also in order to make up for losses of dry gas if the wall units are filled therewith. Conditioning of the wall units in this manner will prevent deposition of moisture and will facilitate conditioning of the interior of a building constructed of the wall units of the present invention.

It is, of course, understood that evacuating the wall units of this invention or providing them with an atmosphere of dry air or a dry gas may be effected by other means and methods as those described herein.

For simplifying the guiding of the dry air or gas, the collecting lines may be disposed in the wall units. The cavities of the wall units may themselves be constructed as air or gas channels. Advantageously, directly in front of the separating wall, an air or gas channel extending from the bottom to the top may be provided as a supply line, and in the uppermost wall unit a bypass channel may be provided, as well as a channel extending from the top to the bottom behind the outer wall, serving as a take-off line. For forming the air or gas channels, the outer walls may comprise vertically directed ribs, the spacing members may be vertically arranged and corrugated reflecting foils may be used with their vertical corrugations superimposed.

The outer panels may be air-tightly built together to form a wall suspended from the building; and an inner wall unit with insulation may be arranged at a spacing therefrom forming an outer air channel, and the inner wall may again be arranged at a spacing, forming an inner air channel.

For air conditioning the rooms from the outer walls, water containers, i.e. in the form of square tubular pipes may be arranged on the inner wall of the wall unit, for the supply or removal of large amounts of heat through the inner wall. The water containers simultaneously serve for strengthening and holding the inner wall so that the reflecting foil insulation may be mounted directly between the floor and the ceiling and the intermediate chambers formed by bores in the cover and base may be constructed as air or gas channels. For partition walls in the interior of the building, an inner wall unit may be provided between two walls, with the formation in each case of an air channel, which is filled with dry air and provided with a volume compensating device. The air channels may be connected by an air circulation system to an air conditioning installation, preferably using dry air, and may serve for air conditioning the walls and the rooms lying therebeyond.

The insulation may consist of reflecting foils arranged at a spacing, the spacing being maintained by perforated foam plastics plates. The reflecting foils may alternately be fixed only at their margins to hard plastics foam rails, and held by means of tension springs. The cavity between the reflecting foils may be subdivided into chambers or cells by a number of narrow perforated strips of hard foam plastics, the strips on one side of the reflecting foil being horizontal and those on the other side vertical. The reflecting foils may be strengthened by the provision of corrugations and inserted into the chambers with the interposition of spacing members. Foils with large corrugations may be held between tensioned bands or cords which are arranged in a zigzag manner.

The volume in the wall elements which has to be kept filled with dry air or another dry gas, for instance, nitrogen, can be essentially reduced by the insertion of insulating elements which themselves are air-tightly closed. This can consist of an air and vapor-tight flexible envelope of plastics which is stiffened by two plates lying parallel to the panels, filling the cavity of the wall unit parallel to the walls and being filled with dry air. The volume compensation can be obtained by changing the spacing of the plates and by a bellows-like construction of the envelope. Insulation, for instance, frames with reflecting foils mounted on them, may be provided in the interior.

For enabling the use of very thin reflecting foils of aluminum, which are particularly suitable, marginal strengthening members, for instance strips, may be provided for them. While the foil is being unrolled, its longitudinal marginal edges are bonded to self-adhesive strips and during cutting of the foil to size, its transverse marginal edges are bonded to such strips, the strips being drawn from rolls. The adhesive strips may be folded over the margins of the foil and may be provided with perforations for facilitating mounting of the foil.

The disclosure of copending application Ser. No. 37,068 which describes other ways and means of providing the wall units with dry air or another dry gas is included by reference in the present application.

The wall panels of the wall units according to the present invention may not only be made of sheet metal but may also be composed of wooden plates, gypsum plates, plates of asbestos cement as known, for instance, under the trademark "ETERNIT," hard rubber plates, and others. The insulating systems within the cavity of the wall units may consist of pressure resistant honeycomb structures made of kraft paper, resin-impregnated paper, hardened plastic foam plates, and the like insulating materials. Non-metallic wall panels are preferably coated with plastic coatings which can be electroplated, and are then electroplated. Thereby, the wall panels are made substantially completely impermeable to vapors.

The wall units according to the present invention can be used not only as structural parts, separating walls, ceilings, and floorings in the interior of buildings but also as external structural parts, since their durability and service life is considerably increased and prolonged.

As stated hereinabove, surface condensation and deposition of condensed water due to changes in temperature and pressure can be prevented not only by introducing dry air or gas into the cavity of the wall units according to the present invention, but also be partial or complete evacuation of the air from said cavities, chambers, or cells.

In order to dry the air in the wall units, especially when the air is not completely evacuated, there can be inserted, as explained hereinabove, perforated containers, capsules, or the like which are filled with a hygroscopic agent capable of absorbing the moisture present in the air, preferably in the lower part of the cavity of the air-tightly sealed wall unit. Preferably a subatmospheric pressure in the wall unit which is slightly below the lowest barometric pressure to be expected in utilizing the wall units, is maintained therein. Since the marginal parts of the wall units cannot be composed of metal but, in order to avoid formation of heat transfer bridges, are preferably made of highly insulating materials such as expanded plastic or hardened plastic foam, a vapor barrier layer or vapor blocking layer must be provided if the air in the wall unit is under subatmospheric pressure or if it is substantially completely evacuated therefrom. For this purpose the marginal strips, borders, bars, or the like of hardened plastic foam are coated with a thin plastic layer which is capable of being electroplated and which is subsequently provided with a metallic skin-like layer by electroplating. Said layer must, of course, be thin enough so that substantially not heat transfer bridge is formed.

It is, of course, also possible to use marginal strips 54, for instance, of FIG. 10 which are sub-divided into two parts and have interposed therebetween, for instance, an aluminum foil 57 as a vapor barrier. Likewise, the rectangular plastic tube 55 surrounding said marginal strips 54 may be electroplated on its inner and outer surfaces. Likewise the plastic foam strips, plates, and the like insulating inserts can be electroplated to provide a thin metal coating after coating them with a plastic layer capable of being electroplated.

An especially useful wall unit according to the present invention is obtained by modifying the wall unit as illustrated in FIG. 1 as will be described hereinafter.

As is evident from FIG. 1, the wall unit actually consists of two insulating wall units, the one wall unit which may be called hereinafter the primary wall unit being formed by the panels 3a and 3b and the other wall unit which may be called hereinafater the associated wall unit being formed by the inner panel 3b and the gypsum or Plaster of Paris plate 16. Panel 3b and plate 16 with spacer strips 15 form the space or chamber 15a. This hollow space 15a thus forms an all around closed associated smaller wall unit.

Like the chambers or cells 8 of the primary wall unit, space 15a can also partly or completely be evacuated by means of valves and a pipe connection to a vacuum pump. Or a dry air or dry gas atmosphere can be provided therein, for instance, by inserting drying agents in said space or by allowing the air in the space to communicate with the atmosphere with the interposition of an air drying plant or by causing dry air or a dry gas to circulate through said space 15a by means of a circulating pump, a dryer, and a volume compensating device as shown in FIG. 13.

The primary wall element serves the purpose to achieve an extremely high thermal and acoustic insulation effect. This is primarily achieved by keeping its cavity free of moisture or by keeping its moisture content at least below the dew point so that formation of condensed water is prevented. In addition thereto, the associated secondary wall element with space 15a has the important function that any condensed water which precipitates on the surface of the gypsum or the like plate 16 due to changes in the temperature of the interior of the respective building, is absorbed by plate 16 and is transferred to space 15a from where it is eliminated by means of the air drying plant.

In order to achieve this result, foils 7a which are provided at the outer surface of interior plate 16 and foils 7b which are provided at the inner surface of plate 16 and on panel 3b with its lacquer coating 4 can either be perforated high-gloss aluminum foils so that condensed water can be transferred through plate 16 into space 15a. It is, of course, also possible to completely omit said foils 7a and 7b so that the condensed water can readily enter space 15a through plate 16. Thus the primary and most important function of the associated secondary wall unit 3b, 16 forming space 15a is the dehumidification of the interior plate 16. If space 15a were not provided, satisfactory dehumidification of plate 16 would not be possible.

It is, of course, also possible to attach the plate 16 directly to the panel 3b provided said panel 3b is also permeable to moisture and thus permits transfer of the water condensed on plate 16 through said panel 3b into the cavity of the primary wall unit where it is eliminated by evacuation, by the drying agent inserted into said cavity, or by the air or gas drying plants interposed in the circulating air or gas or the air or gas flow communicating with the atmosphere or a gasometer.

Of course, many changes and variations in the wall units according to the present invention may be made by those skilled in the art in order to effect reduction of the vapor pressure of the gas present in the wall unit to such an extent that condensation of water vapor does not take place.

Thus, for instance, the insulating means, strips, spacers, ribs, plates, or the like may be polystyrene foam plates, insulating mats, glasswool, rock wool, felted plates, asbestos plates, or the like. Acoustic insulation can be achieved, for instance, by providing, preferably at the inner surfaces of the wall panels, as sound deadening or absorbing means highly viscous or highly polymerized plastic sound damping or absorbing materials such as vinyl acetate copolymerization products and/or sound damping or absorbing plastic foils, such as made of vinylchloride copolymerization products. Such sound damping or absorbing means are advantageously sandwiched between the wall panels and opposed sheet metal or the like panels preferably of the same thickness. Acoustic insulation and sound absorption are very considerably improved by such means.

I claim:

1. In a wall unit comprising panels lying at opposite faces of said unit and defining a cavity, a seal arranged between the margins of said panels to air-tightly seal the wall unit, insulation means occupying the cavity between said panels, said insulation means comprising at least one insulating group extending parallel to said panels and composed of at least two foils capable of reflecting thermal radiation, and chambers lying between said foils, the walls of said chambers consisting of insulating material, and atmosphere control means associated with said wall unit and communicating with the interior thereof for continually maintaining a dry gas atmosphere within said wall unit thereby preventing condensation of water vapor therein, said atmosphere control means comprising pipes, gas drying means, dust filtering means, and pump means for circulating the dry gas through the cavity; said pipes, gas drying means, and dust filtering means being connected with each other and the cavity of the wall unit and forming a closed circulating system.

2. The wall unit of claim 1, in which spacing means are arranged between said reflecting foils, said spacing means being in the form of honeycombed plates.

3. The wall unit of claim 1, in which the walls of the cavity between the panels are substantially pressure resistant.

4. The wall unit of claim 1 further including heating and cooling means in said closed circulating system for heating or cooling the dry gas.

* * * * *